US012609447B2

(12) United States Patent
Chattopadhyay et al.

(10) Patent No.: US 12,609,447 B2
(45) Date of Patent: Apr. 21, 2026

(54) SUBMILLIMETER-WAVE PHASED ARRAYS FOR ELECTRONIC BEAM SCANNING

(71) Applicant: California Institute of Technology, Pasadena, CA (US)

(72) Inventors: Goutam Chattopadhyay, Pasadena, CA (US); Cecile D. Jung-Kubiak, Pasadena, CA (US); Sofia Rahiminejad, Pasadena, CA (US); Subash Khanal, Pasadena, CA (US); Sven L. Van Berkel, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1068 days.

(21) Appl. No.: 17/675,562

(22) Filed: Feb. 18, 2022

(65) Prior Publication Data

US 2022/0267140 A1 Aug. 25, 2022

Related U.S. Application Data

(60) Provisional application No. 63/151,444, filed on Feb. 19, 2021.

(51) Int. Cl.
*H01Q 3/38* (2006.01)
*H01Q 13/06* (2006.01)

(52) U.S. Cl.
CPC ............... *H01Q 3/38* (2013.01); *H01Q 13/06* (2013.01)

(58) Field of Classification Search
CPC H01Q 3/24; H01Q 3/38; H01Q 13/06; H01Q 21/064
See application file for complete search history.

(56) References Cited

U.S. PATENT DOCUMENTS

| | | | | |
|---|---|---|---|---|
| 2020/0127386 | A1* | 4/2020 | Yekan | H01P 5/107 |
| 2021/0013569 | A1 | 1/2021 | Rahiminejad et al. | |
| 2021/0313683 | A1* | 10/2021 | Lipworth | H01Q 21/064 |
| 2023/0027356 | A1* | 1/2023 | Chattopadhyay | H01P 1/02 |

OTHER PUBLICATIONS

Van Berkel, S.L., et al., A 1-D Submm-wave Leaky-Wave Phased Array using MEMS Phase Shifters, 2021 IEEE AP-S Symposium on Antennas and Propagation and USNC-URSI Radio Science Meeting, Marina Bay Sands, Singapore, Dec. 4-10, 2021, pp. 1-2.

(Continued)

*Primary Examiner* — Daniel Munoz
(74) *Attorney, Agent, or Firm* — GATES & COOPER LLP

(57) ABSTRACT

A phased array system comprising an array of antennas outputting or receiving electromagnetic radiation to or from a steerable direction, wherein the electromagnetic radiation is at submillimeter wavelengths. The system further comprises a plurality of waveguides outputting or receiving the signals to or from the antennas, each of the waveguides with individual phase tuning. The waveguides are configured and dimensioned to guide an electromagnetic wave comprising the signals having a frequency in a range of 100 gigahertz (GHz) to 1000 terahertz (THz). The system further comprises means for phase shifting the signal by means of shifting or varying one or more phases of the signals relative to one another so as to vary, steer, or scan a direction of the electromagnetic radiation.

22 Claims, 22 Drawing Sheets

(56) References Cited

OTHER PUBLICATIONS

Van Berkel, S.L., et al., "A 1 D Submm wave Leaky Wave Phased Array using MEMS Phase Shifters", Symposium on Antennas and Propagation and USNC-URSI Radio Science Meeting, Marina Bay Sands, Singapore, Dec. 4-10, 2021, Powerpoint presentation, pp. 1-14.
Khanal, S., et al., "Demonstration of a 1-D Submillimeter-Wave Phased Array with MEMS Phase Shifters", IEEE MTT-S International Microwave and RF Conference 2021, IIT Kanpur, India, Dec. 17-19, 2021, pp. 1-3.
Yang, Y., et al., "An Eight-Element 370-410-GHz Phased-Array Transmitter in 45-nm CMOS SOI With Peak EIRP of 8-8.5 dBm", IEEE Transactions on Microwave Theory and Techniques, Dec. 2016, pp. 4241-4249, vol. 64, No. 12.
Guo, K., et al., "A 0.53-THz Subharmonic Injection-Locked Phased Array With 63-μW Radiated Power in 40-nm CMOS", IEEE Journal of Solid-State Circuits, Feb. 2019, pp. 380-391, vol. 54, No. 2.
Alonso-Delpino, M., et al., "Wideband Multimode Leaky-Wave Feed for Scanning Lens-Phased Array at Submillimeter Wavelengths", IEEE Transactions on Terahertz Science and Technology, Mar. 2021, pp. 205-217, vol. 11, No. 2.
Chen, P-Y, et al., "Terahertz Antenna Phase Shifters Using Integrally-Gated Graphene Transmission-Lines", IEEE Transactions on Antennas and Propagation, Apr. 2013, pp. 1528-1537, vol. 61, No. 4.
Rahiminejad, S., et al.,"A Low-Loss Silicon MEMS Phase Shifter Operating in the 550-GHz Band", IEEE Transactions on Terahertz Science and Technology, Sep. 2021, pp. 477-485, vol. 11, No. 5.
Scattone, F., et al., "A Flat-Topped Leaky-Wave Source for Phased Arrays with Reduced Scan Losses", in The 8th European Conference on Antennas and Propagation, 2014, pp. 1220-1224.
Scattone, F., et al., "Optimization Procedure for Planar Leaky-Wave Antennas With Flat-Topped Radiation Patterns", IEEE Transactions on Antennas and Propagation, 2015, pp. 5854-5859, vol. 63, No. 12.
Blanco, D., et al., "On the Use of Leaky Wave Phased Arrays for the Reduction of the Grating Lobe Level", IEEE Transactions on Antennas and Propagation, Apr. 2014, pp. 1789-1795, vol. 62, No. 4.
Mrkna, M., et al., "An Effective Permittivity Tensor of Cylindrically Perforated Dielectrics", IEEE Antennas and Wireless Propagation Letters, Jan. 2018, pp. 66-69, vol. 17, No. 1.

* cited by examiner

SUBMILLIMETER-WAVE PHASED ARRAYS FOR ELECTRONIC BEAM SCANNING

CROSS REFERENCE TO RELATED APPLICATIONS

This application claims the benefit under 35 USC 119 (e) of co-pending and commonly assigned U.S. Provisional Patent Application Ser. No. 63/151,444, filed Feb. 19, 2021, by Goutam Chattopadhyay, Cecile D Jung-Kubiak, Sofia Rahiminejad, Subash Khanal, and Sven L. Van Berkel., entitled "SUBMILLIMETER-WAVE PHASED ARRAYS FOR ELECTRONIC BEAM STEERING," (CIT-8600-P), which application is incorporated by reference herein.

STATEMENT REGARDING FEDERALLY SPONSORED RESEARCH AND DEVELOPMENT

This invention was made with government support under Grant No. 80NMO0018D0004 awarded by NASA (JPL). The government has certain rights in the invention

BACKGROUND OF THE INVENTION

1. Field of the Invention

The present invention relates to phased array systems and methods of making the same.

2. Description of the Related Art

Submillimeter-wave spectrometers and radiometers have shown to provide valuable information for various applications in astrophysics, earth- and planetary sciences due to the many interesting absorption and rotational lines that are present in this portion of the electromagnetic spectrum. In particular, the presence of numerous spectral lines in the 500 GHz to 600 GHz range that are associated to various water isotopes, allows for remotely studying atmospheric compositions and measuring the surface properties of planetary and cometary bodies. Up-to-date, beam-scanning of such sub mm-wave instrument is achieved by means of mechanical scanning of optical components or re-orientation of the instrument due to a lack of low-loss and wideband phase-shifters, operating at submillimeter wavelengths. What is needed then, is an increase in imaging speed as well as a reduction in instrument mass, size and complexity. The present disclosure satisfies this need using electronic beam-steering with low-loss MEMS phase shifters.

SUMMARY OF THE INVENTION

The present disclosure describes a phased array system outputting a steerable electromagnetic beam at submillimeter wavelengths. The phased array system can be embodied in many ways including, but not limited to, the following.

1. A phased array system comprising an array of antennas outputting or receiving electromagnetic radiation to or from a steerable direction, wherein the electromagnetic radiation is at submillimeter wavelengths. The system further comprises a plurality of waveguides outputting or receiving the signals to or from the antennas, each with individual phase tuning. The waveguides are configured and dimensioned to guide an electromagnetic wave comprising the signals having a frequency in a range of 100 gigahertz (GHz) to 1000 terahertz (THz).

The system further comprises means for phase shifting the signal by means of shifting or varying one or more phases of the signals relative to one another so as to vary, steer, or scan the steerable direction of the electromagnetic radiation. In one or more examples, the means for shifting comprises MEMS phase shifters comprising a dielectric material that is inserted in the waveguides so as to control the speed of propagation of the signal in this waveguide.

2. The phased array system of example 1, wherein:

the antennas comprise n antennas, the means for shifting comprises n phase shifters, the waveguides comprise n waveguides, the signals comprise n signals, and the phases comprise n phases, where n is an integer, the $n^{th}$ phase shifter is coupled to the $n^{th}$ waveguide so as to vary the $n^{th}$ phase of the $n^{th}$ signal in the $n^{th}$ waveguide, and the $n^{th}$ phase shifter increases the phase of $n^{th}$ signal in the $n^{th}$ waveguide with a phase shift relative to the $(n-1)^{th}$ signal in the $(n-1)^{th}$ waveguide.

3. The phased array system of example 2, wherein the phase shift between the signals is 100 degrees or less and a total phase shift between the first signal and the last signal is less than 700 degrees.
4. The phased array system of example 2 or 3, wherein $1 \le n \le 8$.
5. The phased array system of any of the examples 1-4, wherein the phased array system comprises a linear array of the antennas.
6. The phased array system of any of the examples 1-5, wherein the antennas each comprise a double slot.
7. The phased array system of any of the examples 1-6, wherein the n antennas each comprise a double slot terminating a cavity.
8. The phased array system of example 7, comprising waveguide transitions between the waveguides and the cavities, wherein the $n^{th}$ waveguide transition is between the $n^{th}$ cavity and the $n^{th}$ waveguide.
9. The phased array system of example 7, further comprising:

a metal block comprising the waveguides;

a plurality of silicon on insulator substrates mounted on the metal block, wherein the silicon on insulator substrates comprise a first substrate comprising the array of antennas and a second wafer comprising the waveguide transitions.

10. The phased array system of any of the examples 2-9, wherein:

each of the waveguides comprise a first section coupled to a power splitter, a second section coupled to one of the phase shifters, and a third section coupled to the waveguide transitions, and the metal block comprises a split block comprising a middle block, a top block, and a bottom block, wherein:

the middle block comprises a plurality of channels along a first top surface of the middle block and forming a first side of each of the second sections; and a set of first openings, each of the first openings at an outside end of a different one of the channels and extending through a thickness of the middle block to a first bottom surface of the middle block;

the top block comprises a set of second openings through a thickness of the top block, each of the second openings aligned with and coupled to inside end of a different one of the channels; and a second bottom surface forming a second side of each of the second sections so that the top block mated with the middle block forms the second sections of the waveguides, and the bottom block comprises a power splitter comprising set of third openings, each of the third openings coupled to a different one of the first openings so as to:

distribute a combined signal from a transmitter into the waveguides, or combine the signals into a combined signal for transmission to a receiver.

11. The phased array system of example 10, comprising a plurality of screws securing the split blocks together; and a plurality of alignment springs securing and aligning the substrates to the set of second openings in top block; and wherein the metal block has a length and width less than 50 mm and a height of the metal block and the substrates is less than 200 mm.

12. The phased array system of example 10 or 11, further comprising the phase shifters mounted on the first top surface of the middle block between the middle block and the top block so that each of the second sections are coupled to a different one of the phase shifters.

13. The phased array system of any of the examples 1-12, further comprising a superstrate comprising a resonant cavity on or above the antennas, wherein the resonant cavity tailors a permittivity or reflectivity of the superstrate for the electromagnetic radiation so as to suppress grating lobes in the electromagnetic beam.

14. The phased array system of example 13, wherein the superstrate comprises a silicon on insulator having a porosity that tailors the effective permittivity.

15. The phased array system of any of the examples 1-14, wherein a spacing of the antennas is greater than half a center wavelength of the wavelengths of the electromagnetic radiation, as measured in free space.

16. The phased array system of any of the examples 1-15, wherein the means for shifting modulates the phase so as to scan the beam along the direction having an altitude+/−20 degrees with respect a surface normal at a center of a plane comprising the array.

17. The phased array system of any of the examples 1-16, wherein the means for shifting comprises Micro-Electromechanical System (MEMS) devices.

18. The phased array system of any of the examples 1-17, further comprising an electronic circuit connected to the phase shifters, wherein each of the n phase shifters comprise:

a dielectric material; and an actuator connected to the dielectric material; and wherein:

a first actuation by the actuator, in response to a first voltage bias applied by the electronic circuit, moves the dielectric material towards an electromagnetic wave comprising the $n^{th}$ signal transmitted in the $n^{th}$ waveguide, so that an interaction of the dielectric material with the electromagnetic wave causes a phase shift of the signal, and a second actuation by the actuator, in response to a second voltage bias applied by the electronic circuit, moves the dielectric material away from the electromagnetic wave.

19. The phased array system of example 18, wherein the dielectric material comprises:

an input region having a first permittivity tailoring an impedance match of the dielectric material to the $n^{th}$ waveguide guiding the electromagnetic wave;

a transmission region interfacing with the input region and having a second permittivity for the electromagnetic wave transmitted through the input region to the transmission region; and an output region interfacing with the transmission region, the output region tailoring an impedance match of the dielectric material to the waveguide for the electromagnetic wave transmitted from the transmission region and through the output region to the waveguide.

20. The phased array system of any of the examples 18-19, wherein the dielectric material comprises a pattern of holes.

21. A remote sensing system comprising the phased array system of any of the examples 1-20, wherein the electromagnetic beam is used to perform remote sensing.

22. A satellite (e.g., CUBESAT) comprising the phased array system of any of the examples 1-21.

23. A communications system comprising the phased array system of any of the examples 1-20 and 22, wherein the electromagnetic beam transmits a signal comprising data or a message.

24. A medical device or diagnostic tool comprising the phased array system of any of the examples 1-20, wherein the electromagnetic beam is used for the diagnostic (e.g., medical diagnostic).

25. A spectrometer comprising the phased array system of any of the examples 1-20

BRIEF DESCRIPTION OF THE DRAWINGS

Referring now to the drawings in which like reference numbers represent corresponding parts throughout:

FIGS. 3B-3C. H-plane and E-plane patterns of the 8×1 array measured using the setup in

FIG. 3A.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized, and structural changes may be made without departing from the scope of the present invention.

Technical Description

The present disclosure discloses a phased array system comprising an array of antennas outputting or receiving electromagnetic radiation to or from a steerable direction, wherein the electromagnetic radiation is at submillimeter wavelengths. The system further comprises a plurality of waveguides outputting or receiving the signals to or from the antennas, each of the waveguides with individual phase tuning. The waveguides are configured and dimensioned to guide an electromagnetic wave comprising the signals having a frequency in a range of 100 gigahertz (GHz) to 1000 terahertz (THz). The system further comprises means for phase shifting the signal by means of shifting or varying one or more phases of the signals relative to one another so as to vary, steer, or scan the steerable direction of the electromagnetic radiation.

The system can be embodied in many ways including, but not limited to, the examples described below.

First Example: 8×1 Array a. Array Structure

Figure 1A:
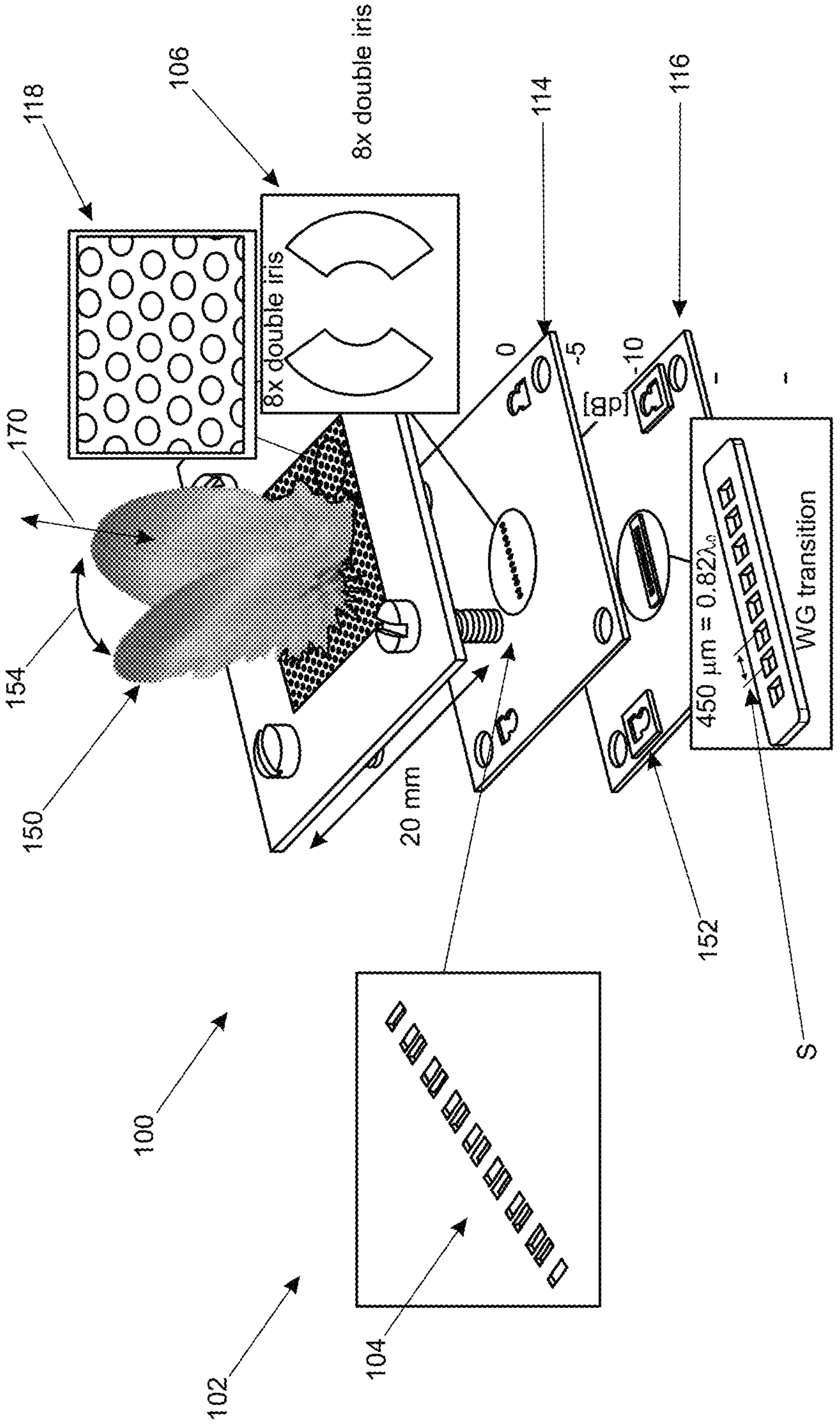
FIG. 1A. An 8×1 antenna array, fabricated in 3 silicon micro-machined wafers.
Figure 1B:
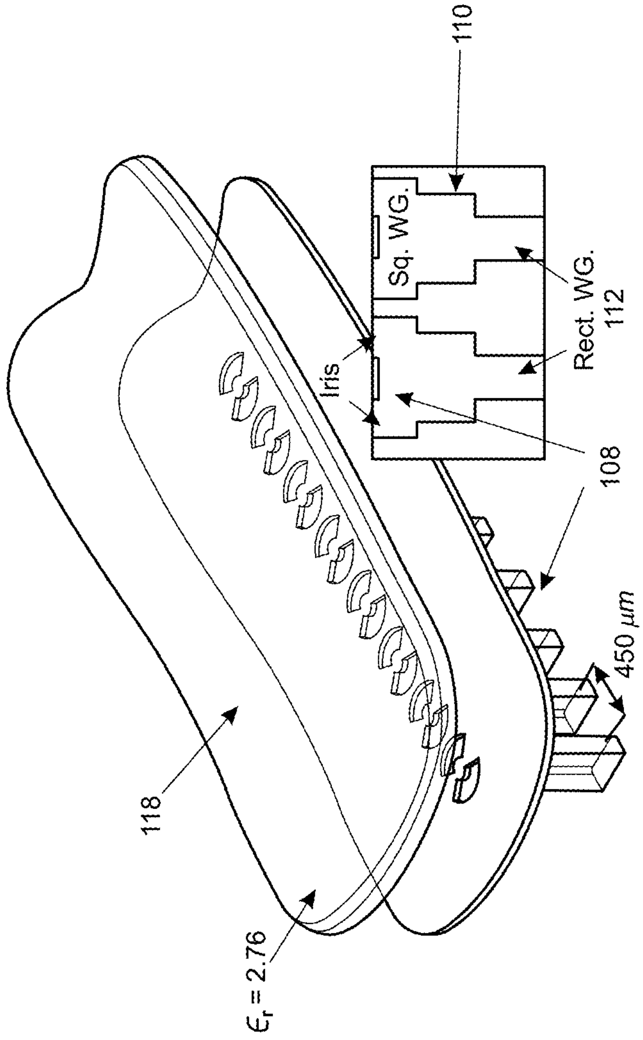
FIG. 1B. Perspective view of the 8×1 antenna array.
Figure 1C:
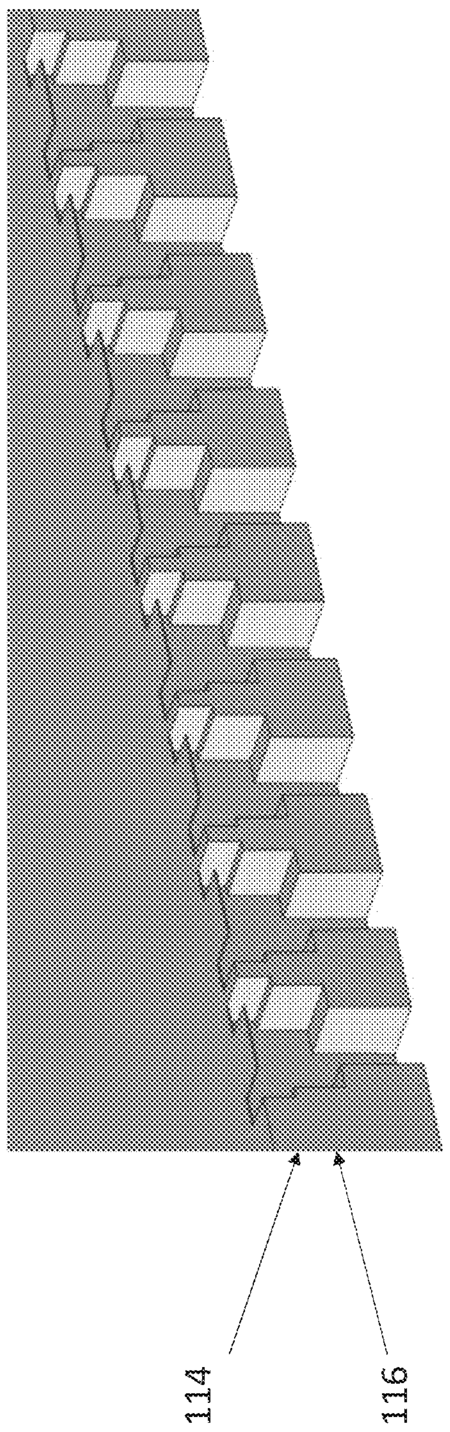
FIG. 1C. Cross-sectional view of the antenna array structure.

FIGS. 1A-1C illustrate an example phased array system 100 comprising 8×1 antenna elements 102 with two slots 104 (or a double iris 106) backed by a square cavity 108 and a waveguide transition 110 to WR1.5 standard waveguide 112. The double iris can be used to achieve an impedance match and a slight suppression of the undesired $TM_0$ leaky wave (LW)-mode. In the example shown, the square cavity 108 comprises a square waveguide (400 μm×381 μm in dimension).

FIG. 1C is a cross-sectional view showing a first silicon on insulator wafer 114 (micromachined with the antenna elements) stacked on a second silicon on insulator wafer 116 (micromachined with the waveguide transitions).

In order to avoid any grating lobes, the spacing between antenna elements needs to be half the free space wavelength. However, due to the fabrication limitations, 450 μm ($0.82\lambda_0$) can be used as the minimum feasible inter-element spacing. As a result, grating lobes appear at θ=60° for maximum scanning angle of 20°.

The effect of the grating lobe is minimized by using a superstrate 118, comprising a Fabry-Perot resonance cavity, to enhance the directivity of the element pattern. In the example shown, the resonance frequency of the LW cavity is set at 550 GHz. The directivity enhancement is proportional to the permittivity of the λ/4 superstrate but is in trade-off with mutual coupling between elements, resulting in increased reflections or pattern degradation. For this example, the optimum permittivity of the superstrate, optimized using a full-wave simulator, is εr=2.72 and the mutual coupling is 20 dB (also suggested by [8] to be an optimum in terms of directivity enhancement and impedance matching).

b. Characterization of the 8×1 Array

Figure 1D:
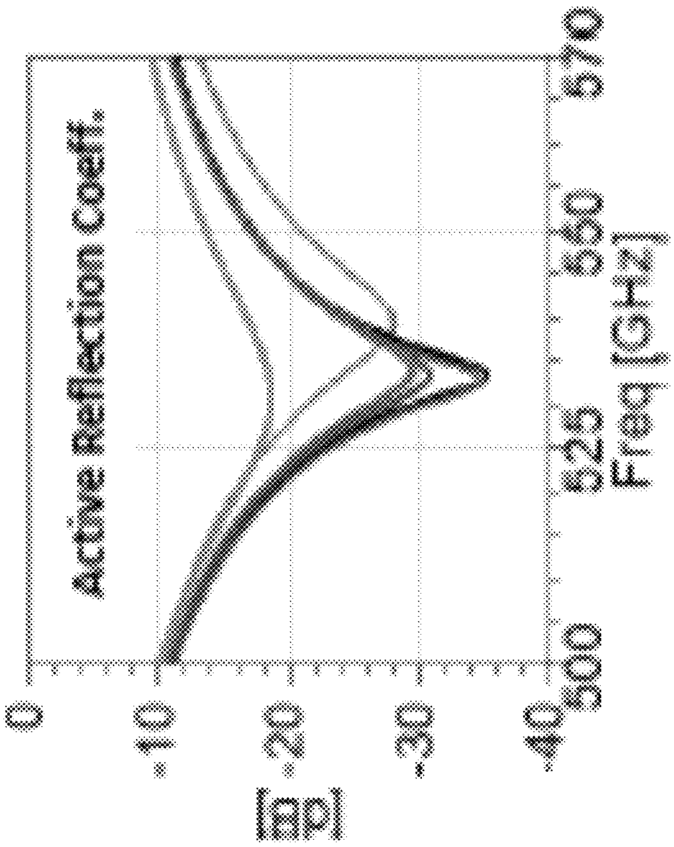
FIG. 1D. Simulated active reflection coefficient of the 8×1 antenna array (double iris antenna).
Figure 1E:
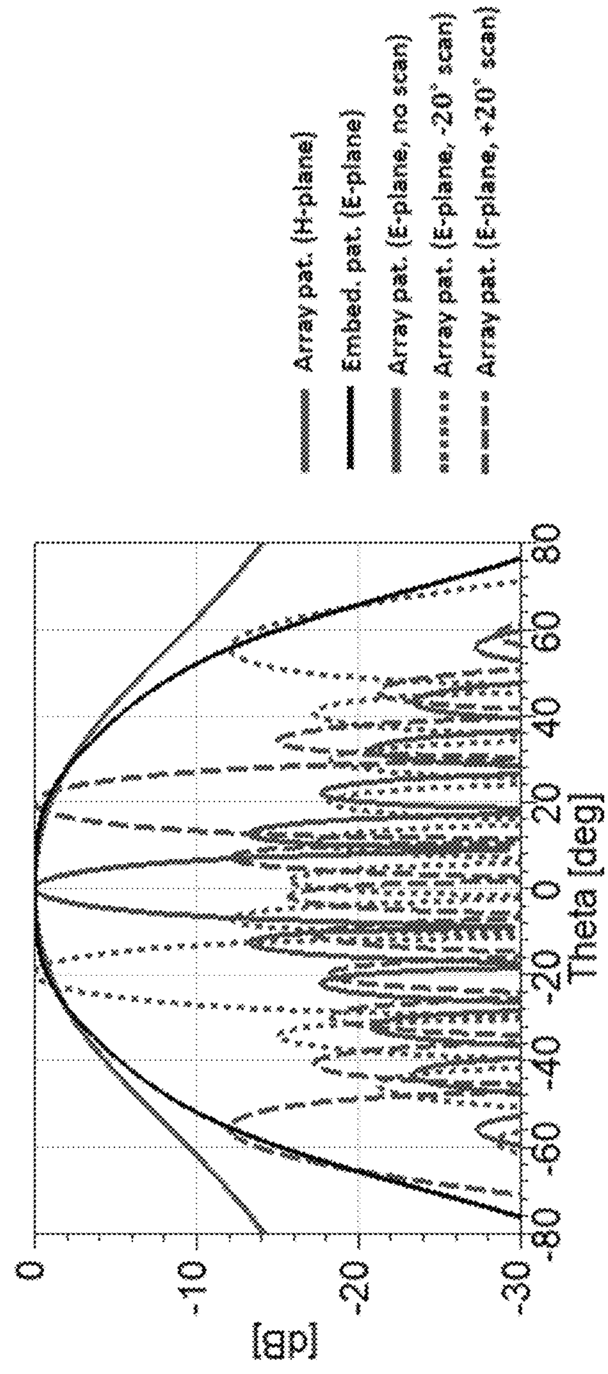
FIG. 1E. The simulated array pattern and E-plane embedded element pattern (double iris antenna in 8×1 array).
Figure 1F:
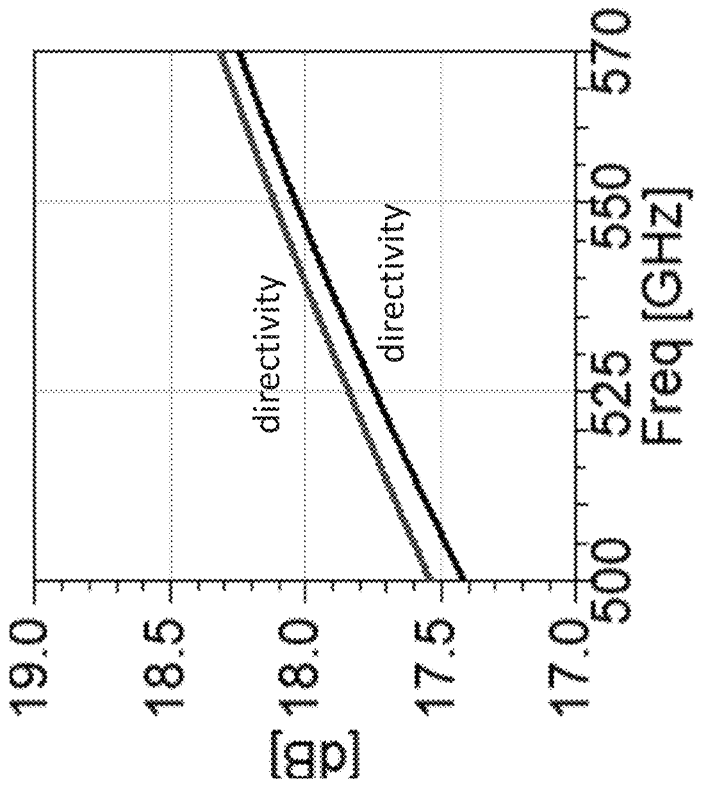
FIG. 1F. Directivity and gain of the 8×1 antenna array as a function of frequency (double slot antenna embodiment).

FIG. 1D presents the active reflection coefficients for all antenna elements, of the double slot without superstrate 118, at the maximum scanning condition, clearly indicating low mutual coupling between the array elements. FIG. 1E shows the simulated E-plane and H-plane antenna array patterns, of the double slot without superstrate 118, at 550 GHz, along with the embedded element pattern, showing a maximum simulated scan angle of 20°. FIG. 1F is a simulation showing a maximum directivity of 18.3 dB. In one or more examples, the side lobe and grating lobe levels is below 10 dB.

Figure 2A:
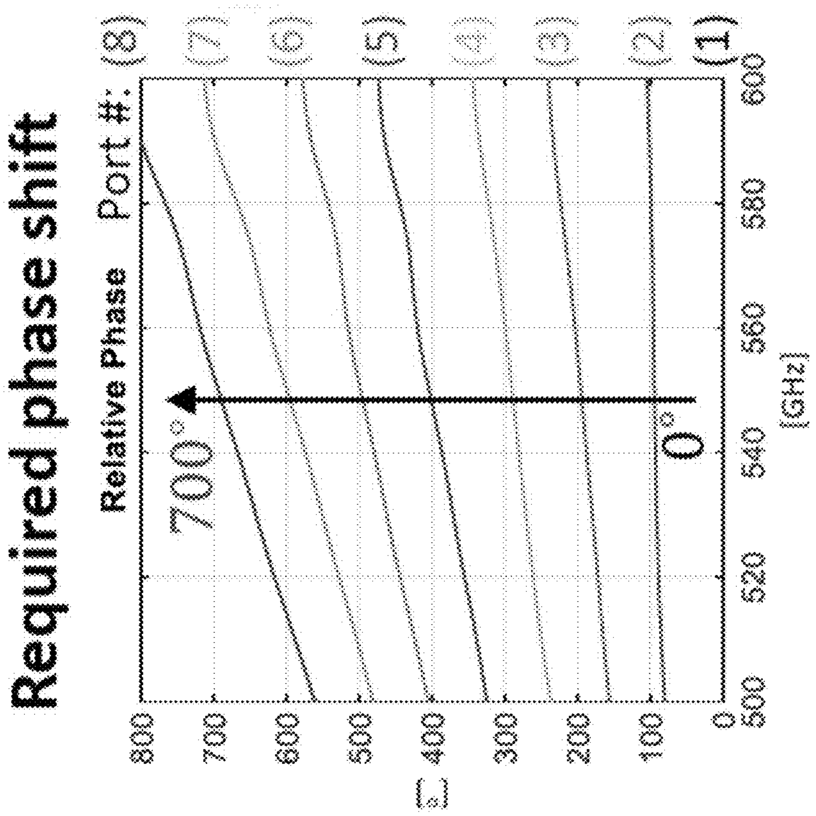
FIG. 2A. Required phase shift applied to each antenna element in 8×1 array order to obtain a scanning range of 20 degrees.
Figure 2B:
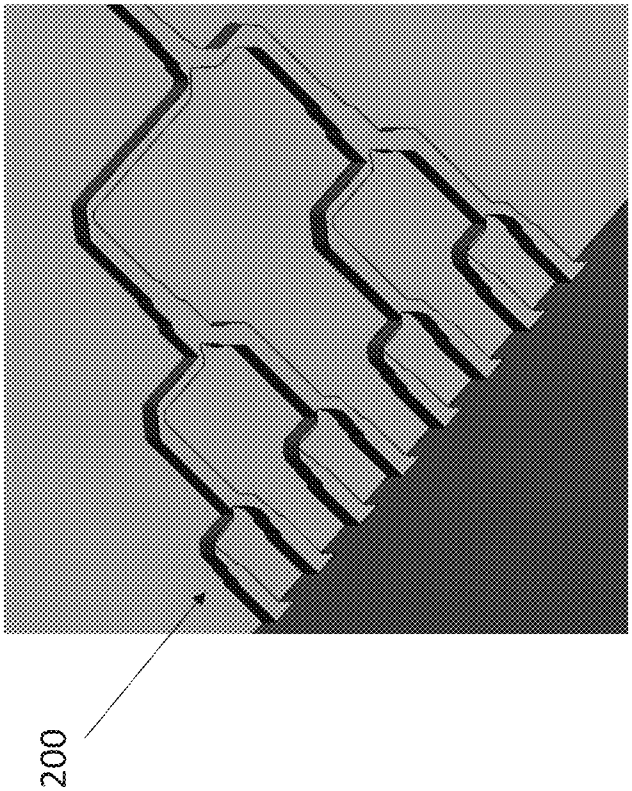
FIG. 2B. Waveguide network (e.g., waveguide feed network) designed and optimized at 550 GHz such that a fixed progressive phase shift is applied to the antenna elements in the 8×1 array (maximum scanning condition).

In order to validate the beam-steering capability of this 8×1 array antenna experimentally, a total phase shift of about 700° is required (see FIG. 2A). However, phase shifting components capable of such achieving such a phase shift at these frequencies are not readily available (at the present time, the MEMS phase shifter [8] can provide about 145° phase shift). FIG. 2B illustrates a waveguide network 200 tailored to introduce the desired phase shifts for beam scanning using the 8×1 array. The varying lengths of the waveguide branches provide a progressive phase shift of 100 degrees between each of the feed signals (optimized at 550 GHz).

Figure 3A:
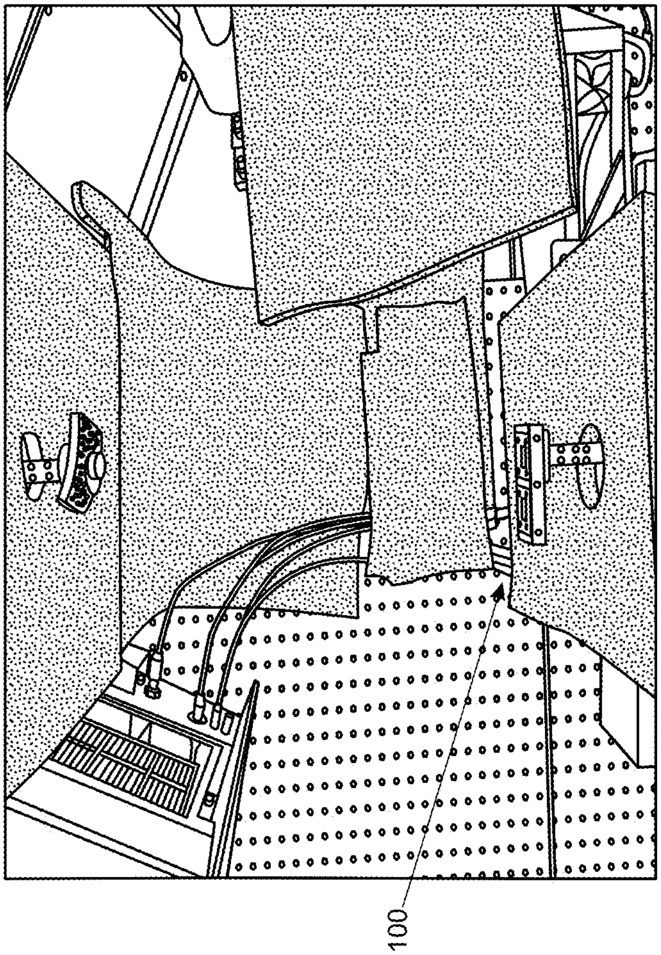
FIG. 3A. Experimental set for characterizing and performing measurements with the antenna arrays described herein.
Figures 3B, 3C:
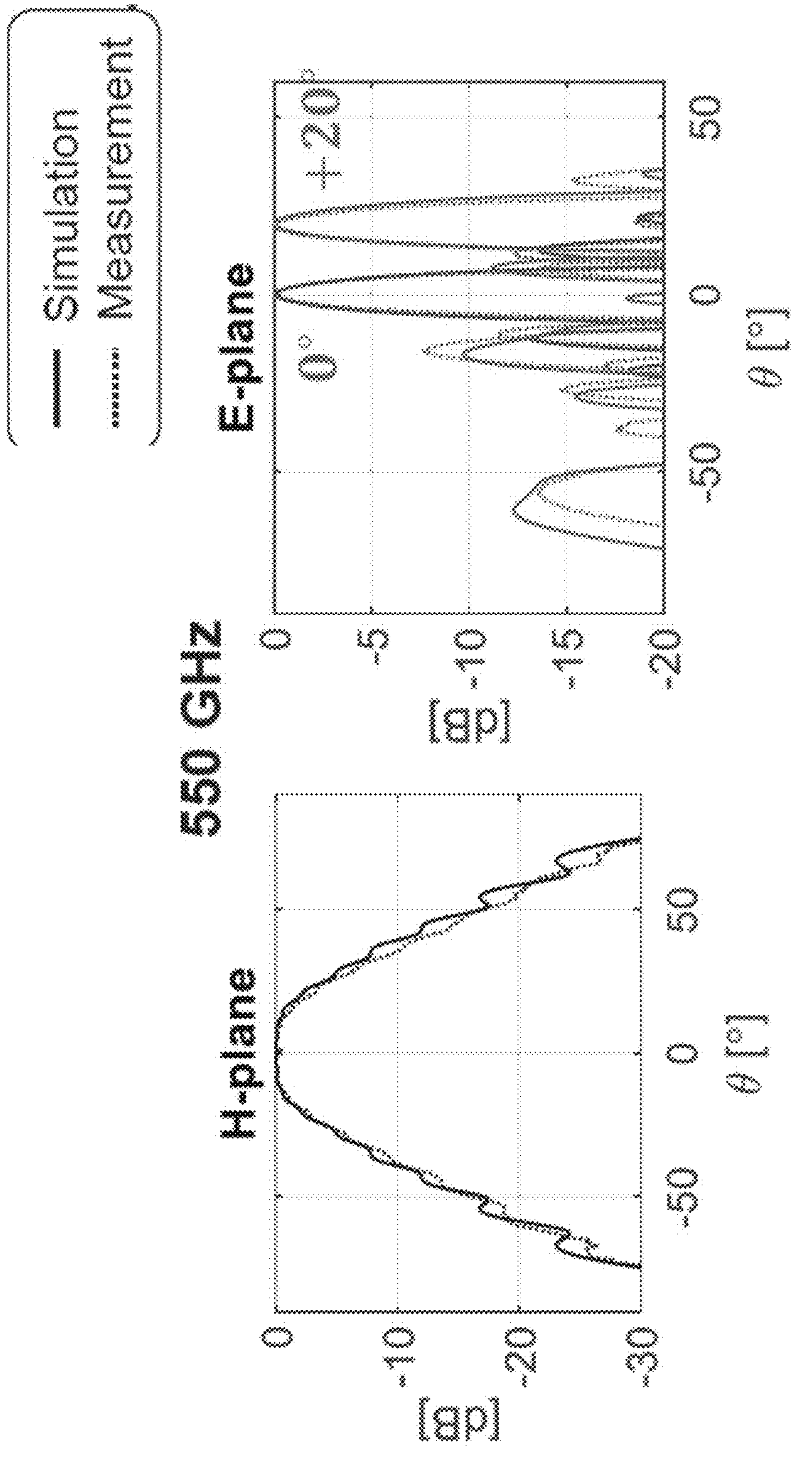
Figure 3D:
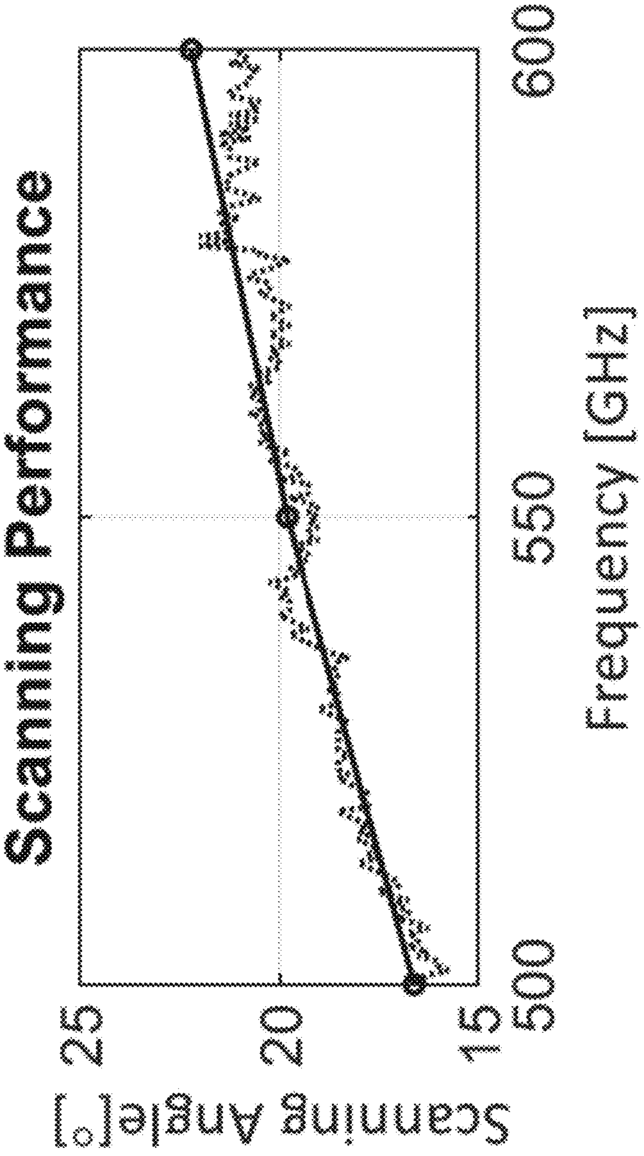
FIG. 3D. Scanning performance of the 8×1 array measured using the setup in FIG. 3A.
Figure 3E:
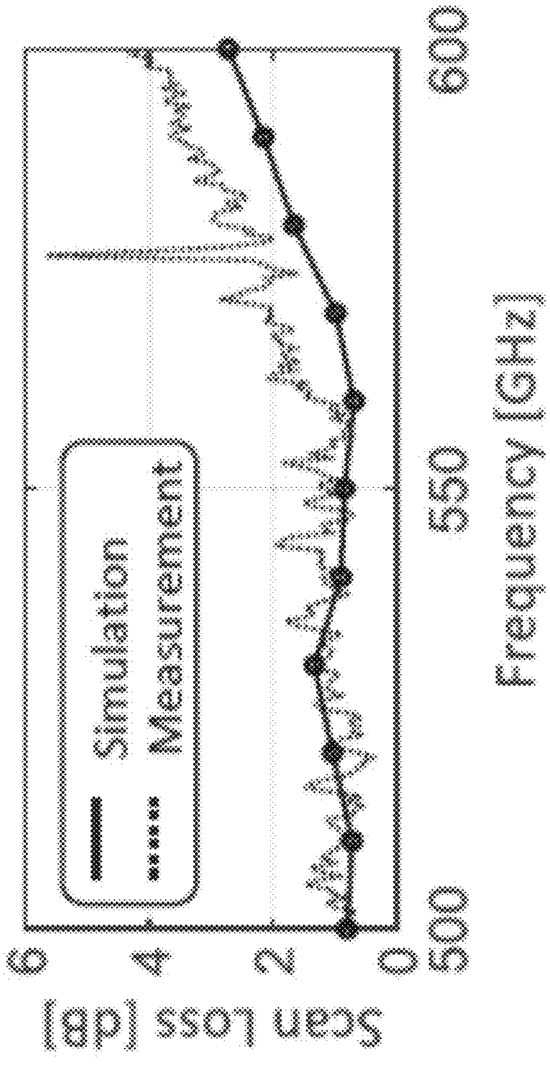
FIG. 3E. Scan loss of the 8×1 array measured using the setup in FIG. 3A.
Figure 3F:
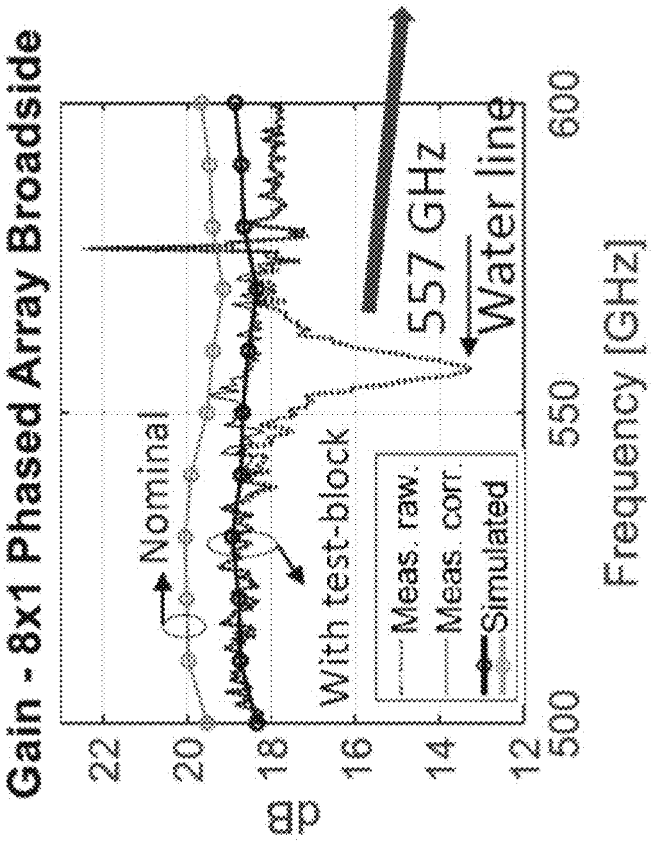
FIG. 3F. Absorption measured using the 8×1 array in the configuration of FIG. 3A.
Figure 3G:
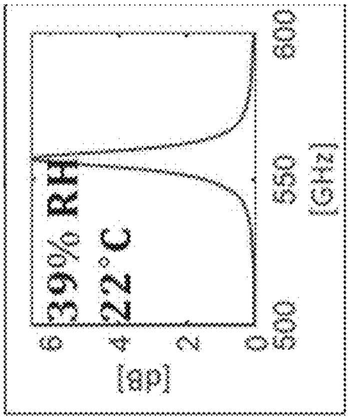
FIG. 3G. Relative humidity measured using the 8×1 array in the configuration of FIG. 3A.

FIG. 3A illustrates an experimental setup for characterizing and performing measurements with the phased array system 100. FIG. 3B and FIG. 3C plot the simulated and experimentally measured H-plane and E-plane patterns, respectively for the 8×1 double slot iris with superstrate. FIG. 3D plots the experimentally measured and simulated scanning performance of the 8×1 phased array system with the double slot iris and superstrate. FIG. 3E plots the simulated and measured scan loss, defined as the loss of aperture gain as the beam is steered away from the boresight direction Θ=0. FIGS. 3F-3G plots the experimentally measured and simulated gain of the 8×1 phased array with the double slot iris and superstrate. The raw measurement shows the water absorption line present in this portion of the spectrum.

Second Example: 4×1 Array with Phase Shifters a. Assembly

FIGS. 4, 5, 6A-6C illustrate a 4×1 submillimeter phased array assembly 400 comprising four MEMS phase shifters 402 [8] that can be integrated with the antenna pixels 404. The phased array assembly comprises a metal block 406 comprising the waveguides; and the silicon on insulator substrates (comprising the antenna array and the waveguide transitions) mounted on the metal block.

Figure 4:
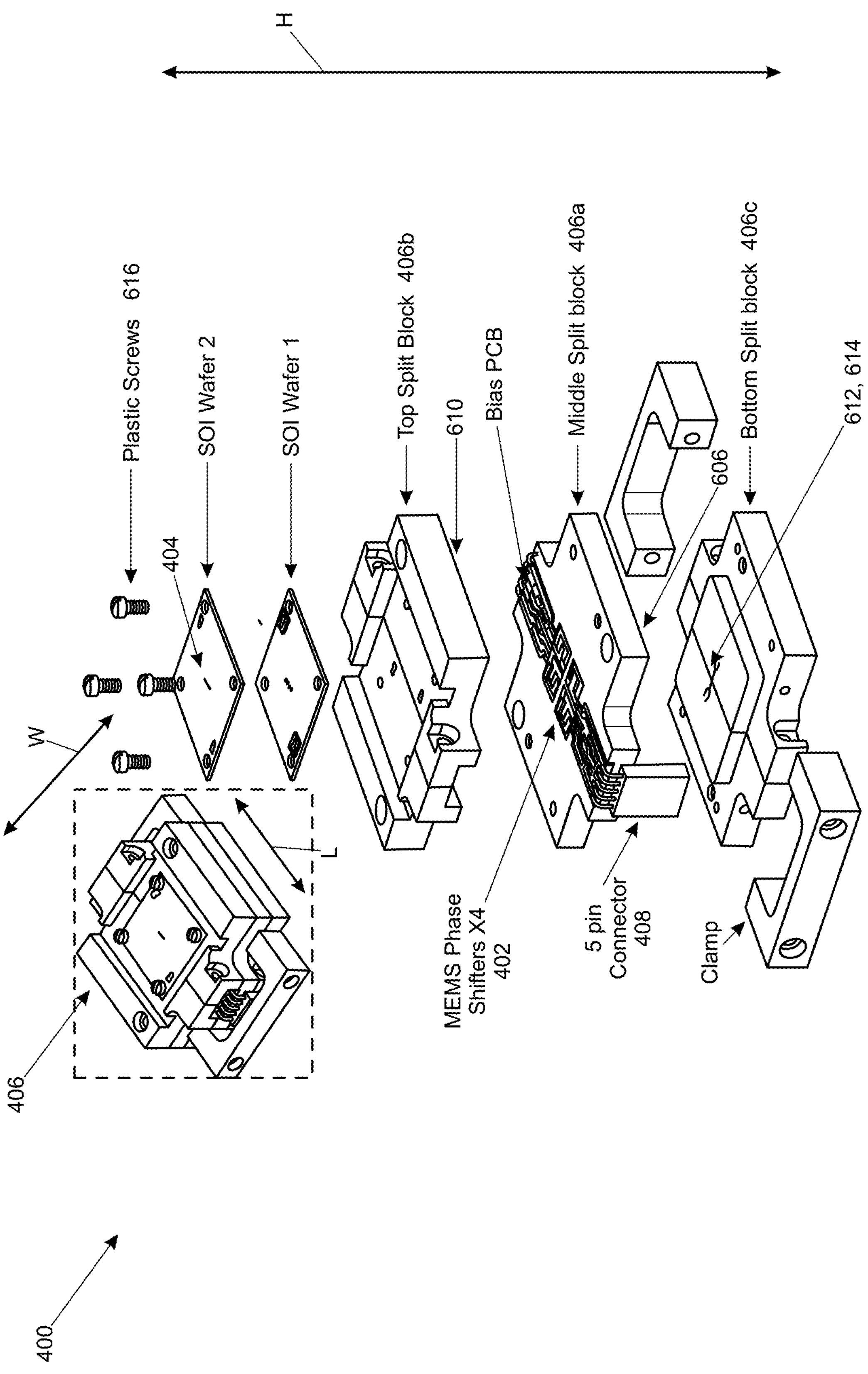
FIG. 4. Exploded view of a compact (35 mm×32 mm×12.5 mm) and integrated concept phased array metal block assembly where a linear 4×1 antenna array is integrated with 4 MEMS phase shifters to realize dynamic beam scanning.
Figure 5:
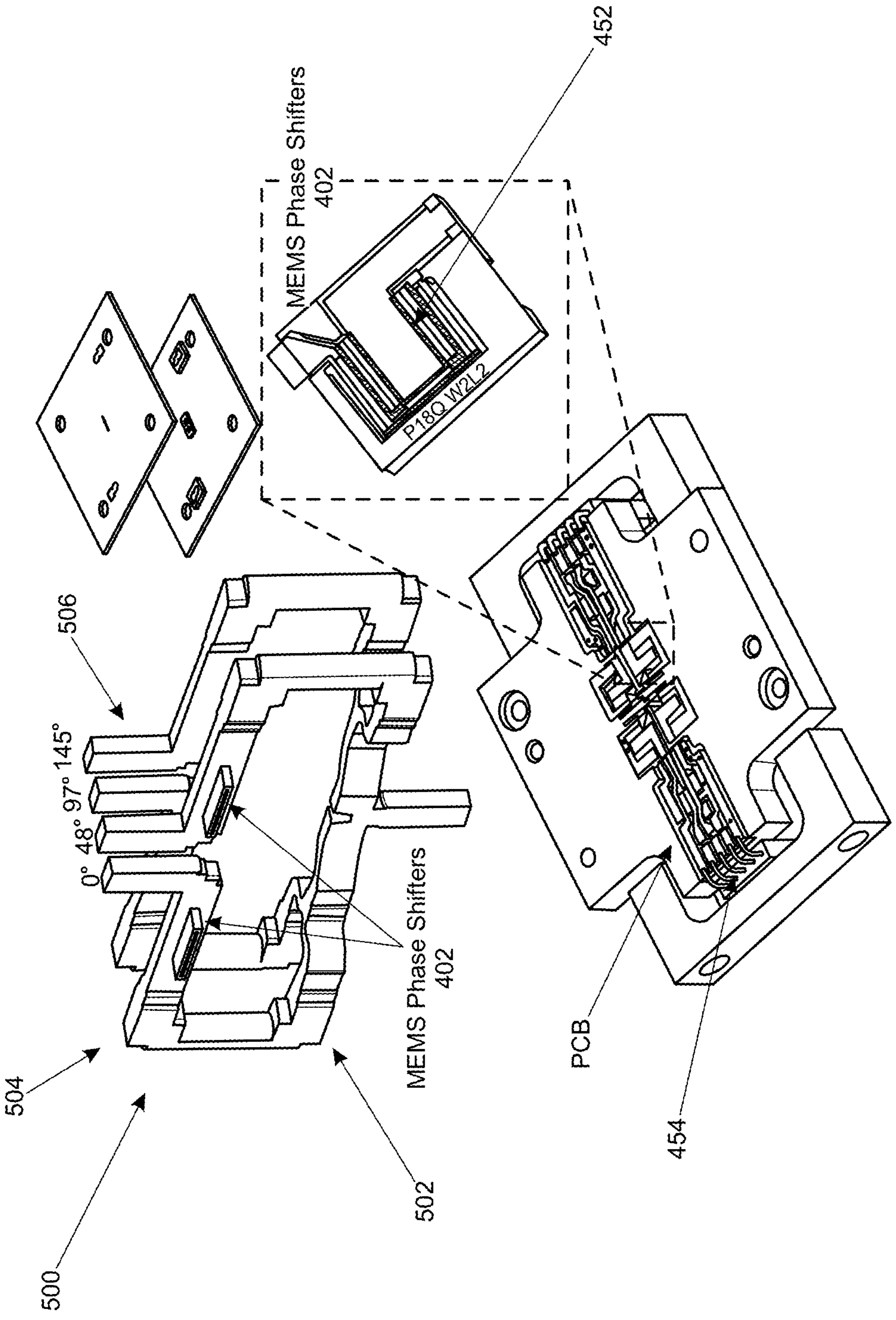
FIG. 5. Phased array with MEMS phase shifters. Integrated waveguide feed network and antenna silicon wafers (top). Middle split of the full metal block assembly showing 4 MEMS phase shifters placed in a compact space, inset: Silicon MEMS phase shifter [8] (middle).

FIG. 5 illustrates the waveguide network 500 (e.g., waveguide feed network), designed with less than 1 dB simulated transmission loss, used to integrate the four MEMS phase shifters 402 with the antenna elements. The waveguide network comprises first sections 502 coupled to a power splitter, second sections 504 each coupled to one of the phase shifters, and third sections 506 coupled to the waveguide transitions. FIG. 4 also shows how the middle split part 406*a* of the full metal block 406 assembly integrates the four MEMS phase shifters 402 with the waveguide network 500 in a compact packaging. The actuation voltages (50V) for all four phase shifters are applied via two printed circuit boards (PCBs) with 5 pin connectors 408.

Figures 6A, 6B:
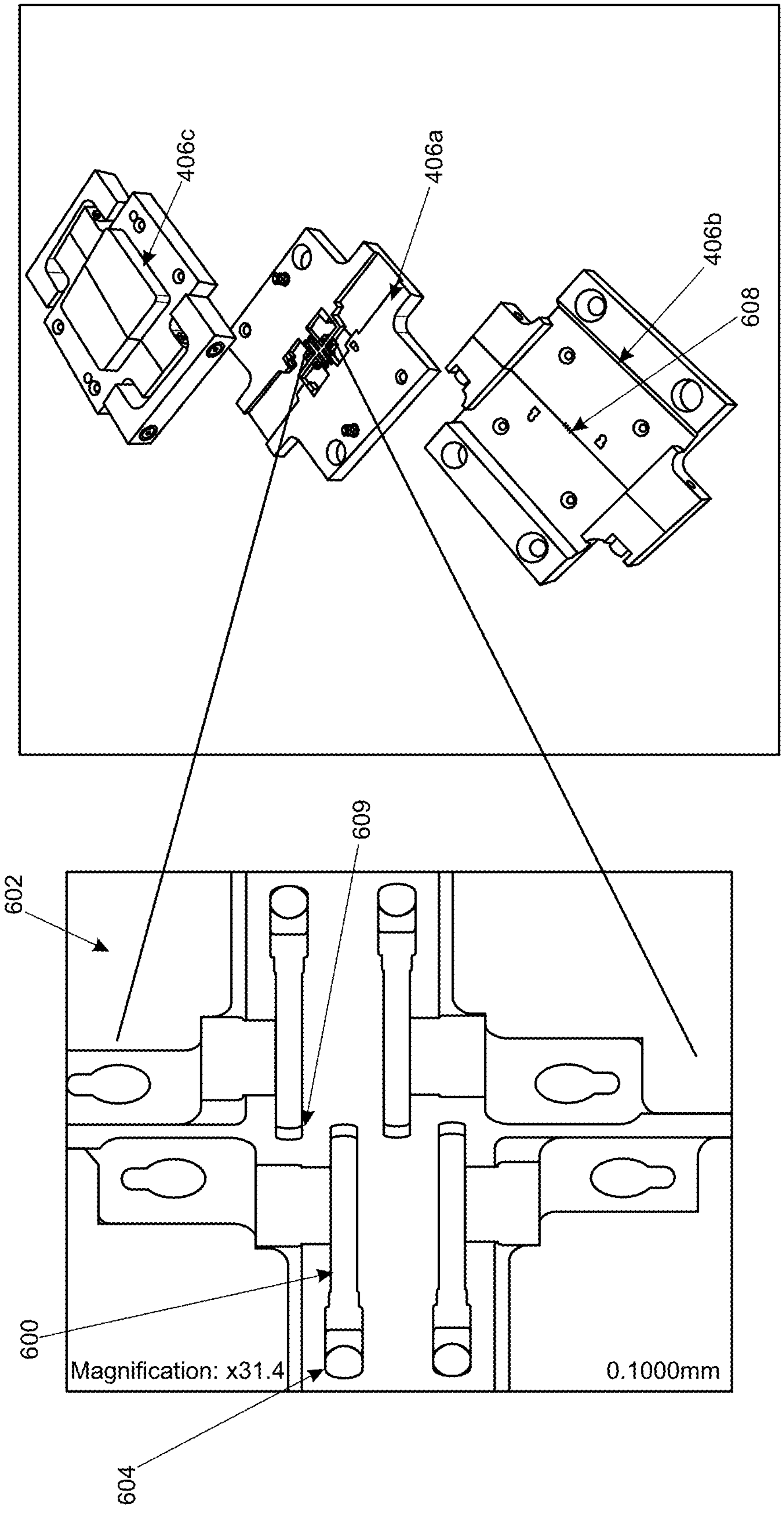
FIG. 6A shows the top view of the middle block.
FIG. 6B shows the top block, middle block, and bottom block before assembly.

FIGS. 4 and 6A-6B illustrate the metal block 406 comprises a split block comprising a top block 406*b*, a middle block 406*a*, and a bottom block 406*c*. The middle block comprises a plurality of channels 600 along a first top surface 602 of the middle block, the channels forming a first side of each of the second sections 504 of the waveguide network. The middle block further comprises a set of first openings 604, each of the first openings at an outside end of a different one of the channels and extending through a thickness of the middle block to a first bottom surface 606 of the middle block.

The top block 406*b* comprises a set of second openings 608 through a thickness of the top block, each of the second openings aligned with and coupled to inside end 609 of a different one of the channels; and a second bottom surface 610 forming a second side of each of the second sections 504 so that the top block mated with the middle block forms the second sections.

The bottom block 406*c* comprises a power splitter 612 comprising set of third openings 614, each of the third openings coupled to a different one of the first openings 604 so as to distribute a combined signal from a transmitter into the waveguides. As illustrated in FIG. 4, a plurality of screws 616 are used to secure the split blocks together.

Figure 6C:
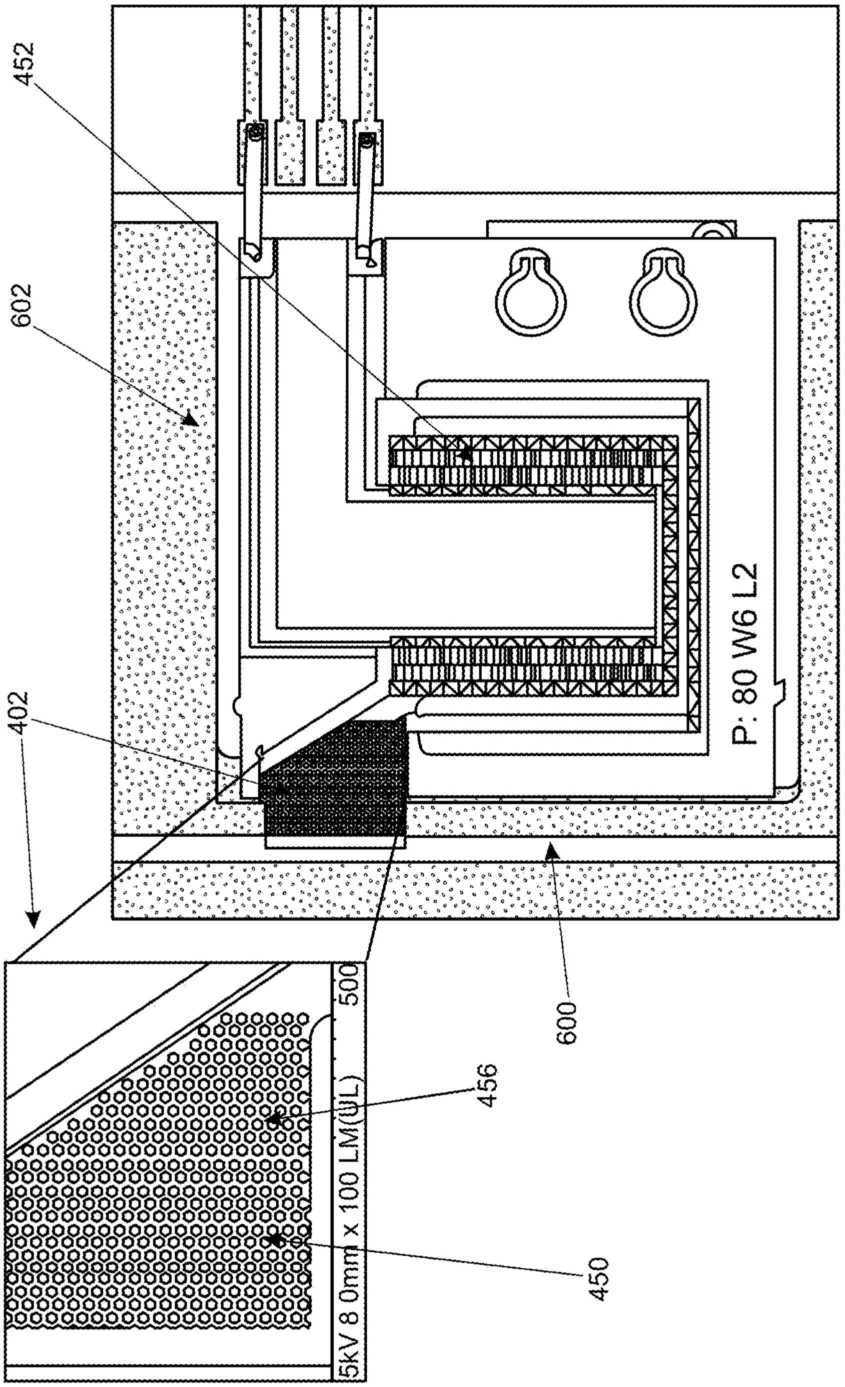
FIG. 6C shows the phase shifters mounted on the middle block.

FIG. 4 and FIG. 6C illustrate the phase shifters 402 mounted on the first top surface 602 of the middle block 406*a* and between the middle block 406*a* and the top block 406*b*, so that each of the second sections 504 are coupled to a different one of the phase shifters 402.

b. Characterization

Figure 7A:
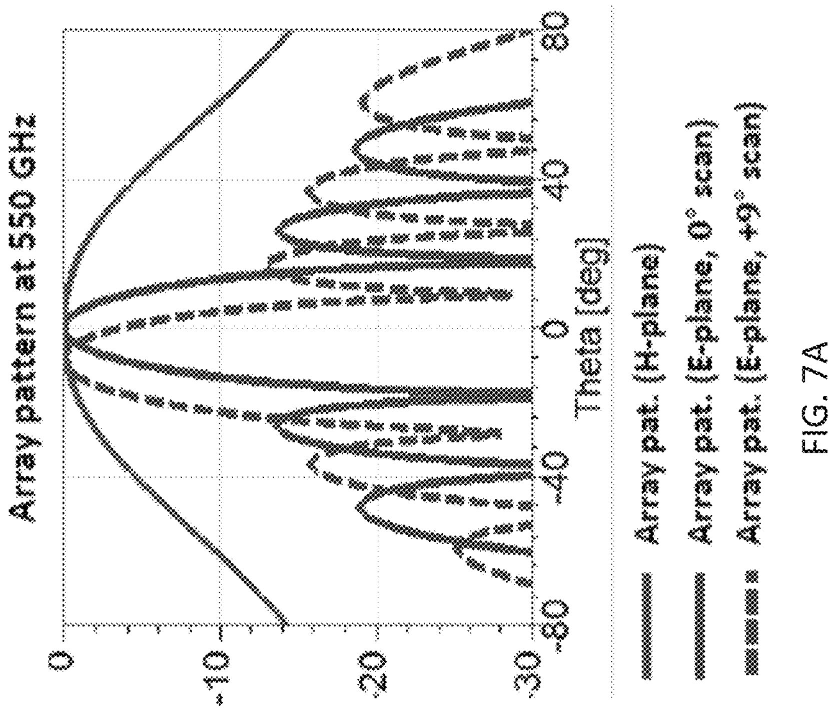
FIG. 7A-7C. Simulation of array pattern (FIG. 7A), scan loss (FIG. 7B), and directivity of the 4×1 array.
Figure 7B:
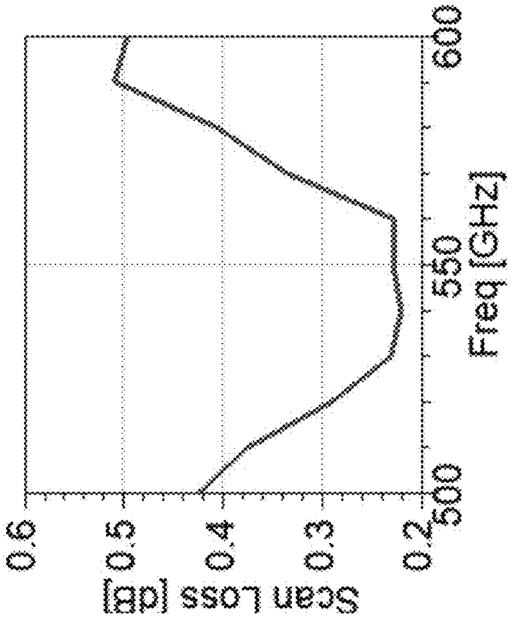
Figure 7C:
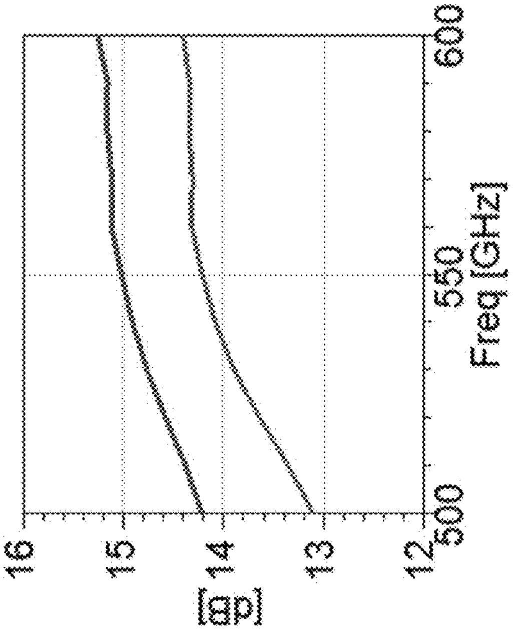
Figure 8B:
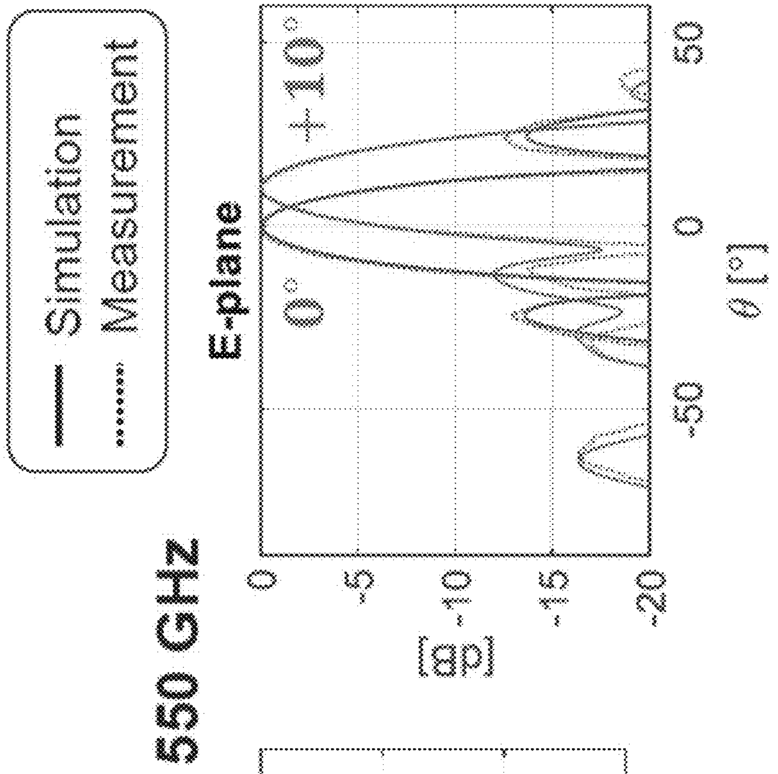
FIG. 8B plots the simulated and measured E-plane of the 4×1 array.
Figure 8A:
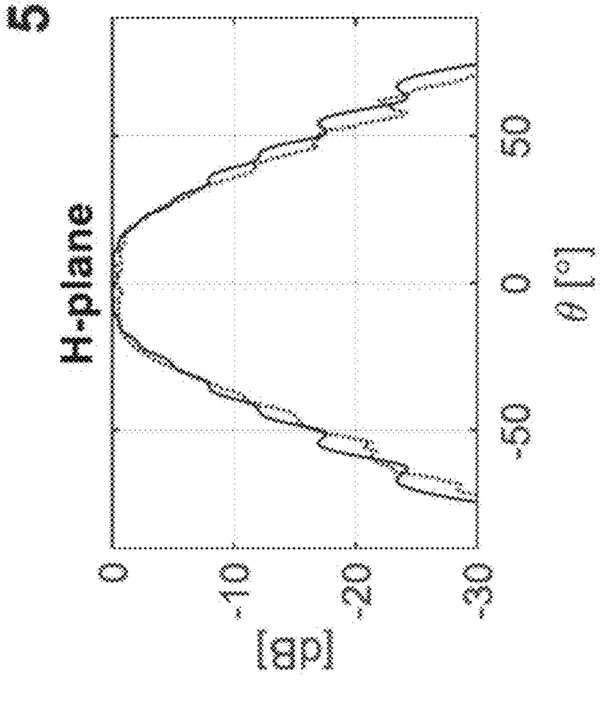
FIG. 8A plots the simulated and measured H-plane of the 4×1 array.
Figure 8C:
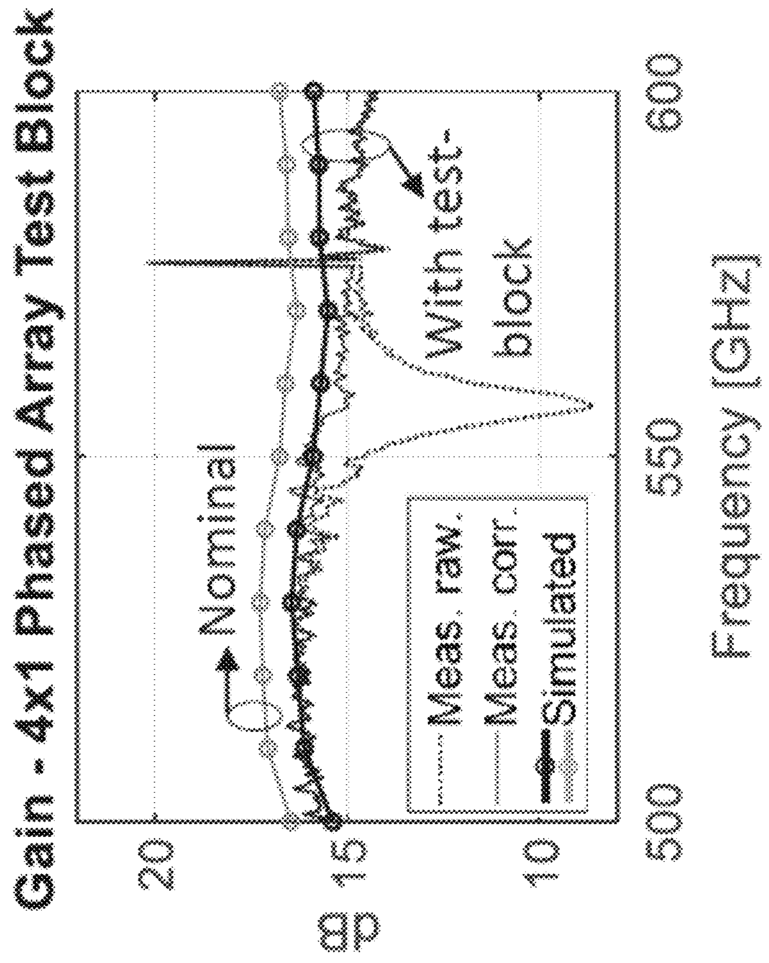
FIG. 8C plots a simulated and measured absorption spectrum obtained using the 4×1 array.

The maximum possible scanning angle was analytically derived from the maximum available progressive phase shift (145°) of the phase shifters and the antenna element spacings. FIG. 7A presents the simulated E-plane and H-plane array patterns at 550 GHz showing 9° beam scanning capability. FIG. 7B shows the simulated 15 dB directivity, and the simulation in FIG. 7C shows a scan loss less than 0.52 dB. FIGS. 8A-8C plot simulation and experimental measurements of the H-plane pattern, E-plane pattern, and water absorption, respectively, obtained using the setup in FIG. 3A.

Process Steps

Figure 9:
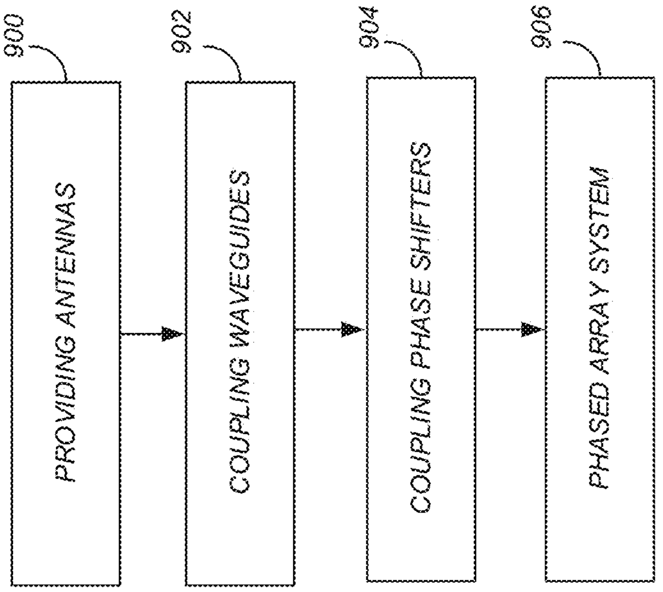
FIG. 9 is a flowchart illustrating a method of making a phased array according to one or more examples.

FIG. 9 is a flowchart illustrating a method of making a phased array system. The method comprises the following steps (referring also to FIGS. 1A-8C).

Block 900 represents fabricating an array of antennas 102 outputting or receiving electromagnetic radiation to or from a steerable direction, wherein the electromagnetic radiation is at or comprises one or more submillimeter wavelengths (e.g., having a frequency in a range of 100 gigahertz (GHz) to 1000 terahertz (THz)).

Block 902 represents fabricating or obtaining a plurality of waveguides 112, and coupling the waveguides to the antennas, so as to output or receive signals to or from the antennas, each of the waveguides with individual phase tuning, and the waveguides configured and dimensioned to guide an electromagnetic wave comprising the signals having a frequency in a range of 100 gigahertz (GHz) to 1000 terahertz (THz).

Block 904 represents fabricating or obtaining means for phase shifting, and optionally coupling the means to the waveguides, the means shifting or varying one or more phases of the signals relative to one another so as to vary, steer, or scan the steerable direction of the electromagnetic radiation. In one or more examples, the means for shifting comprises (e.g., MEMS) phase shifters comprising a dielectric material that is inserted in the waveguides so as to control the speed of propagation of the signal in this waveguide and equivalents thereof.

Block 906 represents the end result, a phased array system 100. The phased array system can be embodied in many ways including, but not limited to, the following examples.

1. A phased array system 100, comprising:
   - an array of antennas 102 outputting or receiving electromagnetic radiation 150 to or from a steerable direction 170, wherein the electromagnetic radiation is at one or more submillimeter wavelengths; and
   - a plurality of waveguides 112 outputting or receiving signals to or from the antennas, each of the waveguides with individual phase tuning, and the waveguides configured and dimensioned to guide an electromagnetic wave comprising the signals having a frequency in a range of 100 gigahertz (GHz) to 1000 terahertz (THz); and
   - means for phase shifting 402 the signals by means of shifting or varying one or more phases of the signals relative to one another so as to vary, steer, or scan the steerable direction.
2. The phased array system of example 1, wherein (see e.g., FIG. 4, or 6A):
   - the antennas comprise n antennas, the means for shifting comprises n phase shifters, the waveguides comprise n waveguides, the signals comprise n signals, and the phases comprise n phases, where n is an integer,
   - the $n^{th}$ phase shifter is coupled to the $n^{th}$ waveguide so as to vary the $n^{th}$ phase of the $n^{th}$ signal in the $n^{th}$ waveguide,
   - the $n^{th}$ phase shifter increases the $n^{th}$ phase of $n^{th}$ signal in the $n^{th}$ waveguide with a phase shift relative to the $(n-1)^{th}$ phase of $(n-1)^{th}$ signal in the $(n-1)^{th}$ waveguide.
3. The phased array system of example 1 or 2, wherein the phase shift between the signals, fed to adjacent ones of the antennas, is 100 degrees or less and a total phase shift between the first signal and the last signal is less than 700 degrees.
4. The phased array system of example 2 or 3, wherein $1 \leq n \leq 8$.
5. The phased array system of any of the examples 1-4, wherein the phased array system comprises a linear array (see e.g., FIG. 1) or 2 dimensional array of the antennas.

6. The phased array system of any of the examples 1-5, wherein the antennas each comprise a double slot 104 or double iris 106.
7. The phased array system of any of the examples 1-6, wherein the n antennas each comprise a double slot terminating a cavity 108 or antenna waveguide.
8. The phased array system of example 7, comprising waveguide transitions 110 between the waveguides and the cavities, wherein the $n^{th}$ waveguide transition is between the $n^{th}$ cavity and the $n^{th}$ waveguide.
9. The phased array system of example 7, further comprising:

a metal block 406 comprising the waveguides 112;

a plurality of silicon on insulator substrates 114, 116 mounted on the metal block, wherein the silicon on insulator substrates comprise a first substrate 114 comprising the array of antennas and a second substrate 116 comprising the waveguide transitions.

10. The phased array system of example 9, wherein:

each of the n waveguides comprise a first section 502 coupled to a power splitter 612, a second section 504 coupled to one of the phase shifters 402, and a third section 506 coupled to the waveguide transitions 110, and the metal block comprises a split block comprising a middle block 406*a* comprising:

a plurality of channels 600 along a first top surface 602 of the middle block and forming a first side of each of the second sections 504; and a set of first openings 604, each of the first openings at a first (e.g., outside end) of a different one of the channels and extending through a thickness of the middle block to a first bottom surface 606 of the middle block;

a top block 406*b* comprising:

a set of second openings 608 through a thickness of the top block, each of the second openings aligned with and coupled to a second end 609 (e.g., inside end) of a different one of the channels; and a second bottom surface 610 forming a second side of each of the second sections so that the top block mated with the middle block forms the second sections 504, a bottom block 406*c* comprising a power splitter 612 comprising set of third openings 614, each of the third openings coupled to a different one of the first openings 604 so as to:

(1) distribute (e.g., a power of) a combined signal from a transmitter into the plurality of signals in the waveguides (e.g., the signals are split from the combined signal), or (2) combine (e.g., a power of) the signals into a combined signal for transmission to a receiver.

a plurality of screws 616 securing the split blocks together; and a plurality of alignment springs 152 securing and aligning the substrates 114, 116 to the set of second openings 608 in top block; and wherein the metal block has a length L and width W less than 50 mm and a height H of the metal block and the substrates is less than 200 mm.

11. The phased array system of example 10, further comprising the phase shifters 402 mounted on the first top surface of the middle block, and between the middle block and the top block, so that each of the second sections are coupled to a different one of the phase shifters.
12. The phased array system of any of the examples 1-11, further comprising a superstrate 118 comprising a resonant cavity on or above the antennas, wherein the resonant cavity tailors a permittivity or reflectivity of the superstrate for the electromagnetic radiation so as to suppress grating lobes in the electromagnetic beam 150.
13. The phased array system of example 12, wherein the superstrate 118 comprises a silicon on insulator having pores or a porosity that tailors the effective permittivity of the superstrate for the electromagnetic radiation.
14. The phased array system of any of the examples 1-13, wherein a spacing S of the antennas is greater than half a center wavelength of the wavelengths as measured in free space.
15. The phased array system of any of the examples 1-14, wherein the means for phase shifting modulates the one or more phases so that the steerable direction has an altitude corresponding to an angle 154 in a range of +/−20 degrees with respect a surface normal at a center of a plane comprising the array.
16. The phased array system of any of the examples 1-15, wherein the means for shifting comprises Micro-Electromechanical System (MEMS) devices.
17. The phased array system of any of the examples 1-16, further comprising an electronic circuit 454 (e.g., comprising a voltage source or transmitting a voltage) connected to the phase shifters 402, wherein each of the n phase shifters comprise:

a dielectric material 450; and an actuator 452 connected to the dielectric material; and wherein:

a first actuation by the actuator, in response to a first voltage bias applied by the electronic circuit, moves the dielectric material towards the electromagnetic wave comprising the $n^{th}$ signal transmitted in the $n^{th}$ waveguide, so that an interaction of the dielectric material with the electromagnetic wave causes a phase shift of the signal, and a second actuation by the actuator, in response to a second voltage bias applied by the electronic circuit, moves the dielectric material away from the electromagnetic wave.

18. The phased array system of example 17, wherein the dielectric material comprises:

an input region having a first permittivity tailoring an impedance match of the dielectric material to the $n^{th}$ waveguide guiding the electromagnetic wave;

a transmission region interfacing with the input region and having a second permittivity for the electromagnetic wave transmitted through the input region to the transmission region; and an output region interfacing with the transmission region, the output region tailoring an impedance match of the dielectric material to the waveguide for the electromagnetic wave transmitted from the transmission region and through the output region to the waveguide.

19. The phased array system of example 18, wherein the dielectric material comprises a pattern of holes 456.
20. A remote sensing system, communication system, or medical device comprising the phased array system of any of the examples, wherein the electromagnetic radiation is used to perform remote sensing, transmit data or a message, receive data or a message or obtain a medical diagnostic.
21. The system of any of the examples, wherein the phase shifter comprises the phase shifter in [13].

22. A receiver or transmitter of the signals, comprising the phased array system of any of the examples 1-21.

ADVANTAGES AND IMPROVEMENTS

THz phased arrays have been demonstrated at frequencies between 340 GHz and 530 GHz using patch antennas, which limits the gain to 12 dB and bandwidth to 10% [1], [2]. Recently, a wideband leaky-wave lens antenna feed that demonstrated 25° of scanning with a 3 dB of scan loss [3] was reported. This 1D scanning is achieved by mechanically translating the lens. If such feed is placed in a phased array configuration, a 48 dB gain can be achieved. Unfortunately, the large phase shift required for such sparsely sampled array has not yet been demonstrated at THz frequencies. Up to 500 GHz, a phase shift can be realized electronically with silicon integrated circuit technologies [1], [2], while at frequencies larger than 1 THz graphene technology has shown some promising results [4].

Recently, low-loss silicon MEMS phase shifters have been demonstrated in the 550 GHz frequency band [5], demonstrating a maximum measured phase shift of 145°. The present disclosure reports on how a waveguide-integrated MEMS phase shifters is an advantageous solution for realizing a THz phased array.

REFERENCES

The following references are incorporated by reference herein.

[1] Y. Yang, O. D. Gurbuz, and G. M. Rebeiz, "An eight-element 370-410-GHz phased-array transmitter in 45-nm CMOS SOI with peak EIRP of 8-8.5 dBm," IEEE Trans. Microw. Theory Techn., vol. 64, no. 12, pp. 4241-4249, 2016.

[2] K. Guo, Y. Zhang, and P. Reynaert, "A 0.53-THz subharmonic injection-locked phased array with 63-μw radiated power in 40-nm CMOS," IEEE J. Solid-State Circuits, vol. 54, no. 2, pp. 380-391, 2019.

[3] M. Alonso-delPino et al., "Wideband multimode leaky-wave feed for scanning lens-phased array at submillimeter wavelengths," IEEE Trans. Terahertz Sci. Technol., vol. 11, no. 2, pp. 205-217, 2021.

[4] P.-Y. Chen, C. Argyropoulos, and A. Alu', "Terahertz antenna phase shifters using integrally-gated graphene transmission-lines," IEEE Trans. Antennas Propag., vol. 61, no. 4, pp. 1528-1537, 2013.

[5] S. Rahiminejad et al., "A low-loss silicon MEMS phase shifter operating in the 550 GHz band," accepted for publication in IEEE Trans. Terahertz Sci. Technol., May 2021.

[6] F. Scattone et al., "A flat-topped leaky-wave source for phased arrays with reduced scan losses," in The 8th European Conference on Antennas and Propagation (EuCAP 2014), 2014, pp. 1220-1224.

[7] "Optimization procedure for planar leaky-wave antennas with flat-topped radiation patterns," IEEE Trans. Antennas Propag., vol. 63, no. 12, pp. 5854-5859, 2015.

[8] D. Blanco, N. Llombart, and E. Rajo-Iglesias, "On the use of leaky wave phased arrays for the reduction of the grating lobe level," IEEE Trans. Antennas Propag., vol. 62, no. 4, pp. 1789-1795, 2014.

[9] M. Mrnka and Z. Raida, "An effective permittivity tensor of cylindrically perforated dielectrics," IEEE Antennas Wirel. Propag. Lett., vol. 17, no. 1, pp. 66-69, 2017.

[10] Demonstration of a 1-D Submillimeter-Wave Phased Array With MEMS Phase Shifters, S. Khanal, S. L. van Berkel, S. Rahiminejad, C. Jung-Kubiak, A. Maestrini, G. Chattopadhyay. In IEEE MTT-S International Microwave and RF Conference 2021, IIT Kanpur, India, Dec. 17-19 2021, wherein the subject matter in was made by or originated from one or more members of the inventive entity of this patent application.

[11] A 1-D Submm-wave Leaky-Wave Phased Array using MEMS Phase Shifter S. L. van Berkel, S. Khanal, S. Rahiminejad, C. Jung-Kubiak, A. Maestrini, G. Chattopadhyay In 2021 IEEE AP-S Symposium on Antennas and Propagation and USNC-URSI Radio Science Meeting, Marina Bay Sands, Singapore, Dec. 4-10 2021, wherein the subject matter in [11] was made by or originated from one or more members of the inventive entity of this patent application.

[12] Power point slides for the presentation in [11], wherein the subject matter in was made by or originated from one or more members of the inventive entity of this patent application.

[13] patent application Ser. No. 16/922,719 corresponding to publication No. US20210013569 entitled "Low loss microelectromechanical system (MEMS) shifter" wherein the subject matter in was made by or originated from one or more members of the inventive entity of this patent application.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A phased array system, comprising:

an array of antennas outputting or receiving electromagnetic radiation to or from a steerable direction, wherein the electromagnetic radiation is at one or more submillimeter wavelengths; and a plurality of waveguides outputting or receiving signals to or from the antennas, each of the waveguides coupled to individual means for phase shifting, and each of the waveguides configured and dimensioned to guide an electromagnetic wave comprising the signals having a frequency in a range of 100 gigahertz (GHz) to 1000 terahertz (THz); and each of the means for phase shifting actuatable to move a dielectric material towards or away from the electromagnetic wave to vary one of more phases of the electromagnetic wave guided by different ones of the waveguides relative to one another so as to vary, steer, or scan the steerable direction.

2. The phased array system of claim 1, wherein:

the antennas comprise n antennas, the means for phase shifting comprises n phase shifters, the waveguides comprise n waveguides, the signals comprise n signals, and the phases comprise n phases, where n is an integer, the $n^{th}$ phase shifter is coupled to the $n^{th}$ waveguide so as to vary the $n^{th}$ phase of the $n^{th}$ signal in the $n^{th}$ waveguide, and the $n^{th}$ phase shifter increases the $n^{th}$ phase of the $n^{th}$ signal in the $n^{th}$ waveguide with a phase shift relative to the $(n-1)^{th}$ phase of $(n-1)^{th}$ signal in the $(n-1)^{th}$ waveguide.

3. The phased array system of claim 2, wherein the phase shift between the signals, fed to or received from adjacent ones of the antennas, is 100 degrees or less and a total phase shift between the first signal and the last signal is less than 700 degrees.

4. The phased array system of claim 2, wherein $1 \leq n \leq 8$.

5. The phased array system of claim 1, wherein the phased array comprises a linear array or 2 dimensional array of the antennas.

6. The phased array system of claim 1, wherein the antennas each comprise a double slot or double iris.

7. The phased array system of claim 2, wherein the n antennas each comprise a double slot terminating a cavity or antenna waveguide.

8. The phased array system of claim 1, wherein the antennas comprise n antennas, the means for phase shifting comprises n phase shifters, and the waveguides comprise n waveguides, the system further comprising waveguide transitions between the waveguides and the antennas, wherein the $n^{th}$ waveguide transition is between the $n^{th}$ antenna and the $n^{th}$ waveguide.

9. The phased array system of claim 8, further comprising:

a metal block comprising the waveguides; and a plurality of silicon on insulator substrates mounted on the metal block, wherein the silicon on insulator substrates comprise a first substrate comprising the array of antennas and a second substrate comprising the waveguide transitions.

10. The phased array system of claim 9, wherein:

each of the n waveguides comprise a first section coupled to a power splitter, a second section coupled to one of the phase shifters, and a third section coupled to the waveguide transitions, and the metal block comprises a split block comprising a middle block comprising:

a plurality of channels along a first top surface of the middle block and forming a first side of each of the second sections; and a set of first openings, each of the first openings at an outside end of a different one of the channels and extending through a thickness of the middle block to a first bottom surface of the middle block;

a top block comprising:

a set of second openings through a thickness of the top block, each of the second openings aligned with and coupled to inside end of a different one of the channels; and a second bottom surface forming a second side of each of the second sections so that the top block mated with the middle block forms the second sections, a bottom block comprising the power splitter comprising set of third openings, each of the third openings coupled to a different one of the first openings so as to:

distribute a combined signal from a transmitter into the plurality of the signals in the waveguides, or combine the signals into the combined signal transmitted to a receiver a plurality of screws securing the split block together; and a plurality of alignment springs securing and aligning the substrates to the set of second openings in top block; and wherein the metal block has a length and width less than 50 mm and a height of the metal block and the substrates is less than 200 mm.

11. The phased array system of claim 10, further comprising the phase shifters mounted on the first top surface of the middle block, and between the middle block and the top block, so that each of the second sections are coupled to a different one of the phase shifters.

12. The phased array system of claim 1, further comprising a superstrate comprising a resonant cavity on or above the antennas, wherein the resonant cavity tailors a permittivity or reflectivity of the superstrate for the electromagnetic radiation so as to suppress grating lobes in the electromagnetic radiation.

13. The phased array system of claim 12, wherein the superstrate comprises a silicon on insulator having a porosity that tailors the effective permittivity.

14. The phased array system of claim 1, wherein a spacing of the antennas is greater than half a center wavelength of the wavelengths as measured in free space.

15. The phased array system of claim 1, wherein the means for phase shifting modulates the one or more phases so that the steerable direction has an altitude corresponding to an angle in a range of +/−20 degrees with respect a surface normal at a center of a plane comprising the array.

16. The phased array system of claim 1, wherein the means for shifting comprises Micro-Electromechanical System (MEMS) devices.

17. The phased array system of claim 2, further comprising an electronic circuit connected to the phase shifters, wherein each of the n phase shifters comprise:

the dielectric material; and an actuator connected to the dielectric material; and wherein:

a first actuation by the actuator, in response to a first voltage bias applied by the electronic circuit, moves the dielectric material towards the electromagnetic wave comprising the $n^{th}$ signal transmitted in the $n^{th}$ waveguide, so that an interaction of the dielectric material with the electromagnetic wave causes a phase shift of the signal, and a second actuation by the actuator, in response to a second voltage bias applied by the electronic circuit, moves the dielectric material away from the electromagnetic wave.

18. The phased array system of claim 17, wherein the dielectric material comprises:

an input region having a first permittivity tailoring an impedance match of the dielectric material to the $n^{th}$ waveguide guiding the electromagnetic wave;

a transmission region interfacing with the input region and having a second permittivity for the electromagnetic wave transmitted through the input region to the transmission region; and an output region interfacing with the transmission region, the output region tailoring an impedance match of the dielectric material to the waveguide for the electromagnetic wave transmitted from the transmission region and through the output region to the waveguide.

19. The phased array system of claim 17, wherein the dielectric material comprises a pattern of holes.

20. A remote sensing system, communication system, or medical device comprising the phased array system of claim 1, wherein the electromagnetic radiation is used to perform remote sensing, transmit data or a message, receive data or a message, or obtain a medical diagnostic.

21. A phased array system, comprising:

an array of antennas outputting or receiving electromagnetic radiation, wherein the electromagnetic radiation is at one or more submillimeter wavelengths; and a plurality of waveguides each feeding to a different one of the antennas, the waveguides configured and dimensioned to guide an electromagnetic wave comprising the signals having a frequency in a range of 100 gigahertz (GHz) to 1000 terahertz (THz); and a plurality of actuators and/or Micro-Electromechanical System (MEMS) devices each comprising or coupled to a dielectric material, each of the MEMS devices or actuators coupled to a different one of the waveguides and configured to move the dielectric material towards or away from the electromagnetic wave to vary one or more phases of the electromagnetic wave guided by different ones of the waveguides relative to one another.

22. A method of making phased array system, comprising: coupling:

an array of antennas outputting or receiving electromagnetic radiation, wherein the electromagnetic radiation is at one or more submillimeter wavelengths; and a plurality of waveguides each feeding to a different one of the antennas, the waveguides configured and dimensioned to guide an electromagnetic wave comprising the signals having a frequency in a range of 100 gigahertz (GHz) to 1000 terahertz (THz); and a plurality of actuators and/or Micro-Electromechanical System (MEMS) devices each comprising or coupled to a dielectric material, each of the MEMS devices or actuators coupled to a different one of the waveguides and configured to move the dielectric material towards or away from the electromagnetic wave to vary one or more phases of the electromagnetic wave guided by different ones of the waveguides relative to one another.

* * * * *